US010650644B2

(12) United States Patent
Comeau et al.

(10) Patent No.: US 10,650,644 B2
(45) Date of Patent: May 12, 2020

(54) SYSTEMS, METHODS AND DEVICES FOR MOVING GAME COMPONENTS IN GAMING SYSTEMS

(71) Applicant: IGT CANADA SOLUTIONS ULC, Moncton (CA)

(72) Inventors: Brian Comeau, Memramcook (CA); Vicky Leblanc, Moncton (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 375 days.

(21) Appl. No.: 14/291,626

(22) Filed: May 30, 2014

(65) Prior Publication Data

US 2015/0348358 A1 Dec. 3, 2015

(51) Int. Cl.

| | |
|---|---|
| ***A63F 9/24*** | (2006.01) |
| ***A63F 13/00*** | (2014.01) |
| ***G06F 17/00*** | (2019.01) |
| ***G07F 17/34*** | (2006.01) |
| ***G07F 17/32*** | (2006.01) |

(52) U.S. Cl.
CPC .......... *G07F 17/34* (2013.01); *G07F 17/3206* (2013.01); *G07F 17/3211* (2013.01)

(58) Field of Classification Search
CPC ........ A63F 13/20; A63F 13/21; A63F 13/212; A63F 13/213; A63F 13/245; G07F 17/3206; G07F 17/3209
See application file for complete search history.

(56) References Cited

U.S. PATENT DOCUMENTS

| | | | | |
|---|---|---|---|---|
| 6,222,465 | B1 | 4/2001 | Kumar et al. | |
| 6,361,436 | B1 * | 3/2002 | Gouji | A63F 9/305 463/31 |
| 6,545,664 | B1 * | 4/2003 | Kim | G06F 3/012 345/156 |
| 7,815,507 | B2 | 10/2010 | Parrott et al. | |
| 7,942,744 | B2 | 5/2011 | Wells | |
| 8,684,839 | B2 | 4/2014 | Mattice et al. | |
| 2001/0040572 | A1 * | 11/2001 | Bradski | G06F 3/012 345/419 |
| 2002/0022518 | A1 * | 2/2002 | Okuda | A63F 13/08 463/36 |
| 2002/0055383 | A1 * | 5/2002 | Onda | A63F 13/08 463/36 |

(Continued)

*Primary Examiner* — Kang Hu
*Assistant Examiner* — Jason Pinheiro
(74) *Attorney, Agent, or Firm* — Sage Patent Group

(57) ABSTRACT

A computer device and method for moving game components are provided. The computer device comprises: at least one data storage device to store game data for a game; a display device to display at least one three-dimensional game component of the game; at least one data capture device to collect player movement data, wherein the player movement data defines movement of a player of the game, wherein the data capture device includes a camera, a sensor or other data capture electronic hardware; and at least one processor configured to: 1) transform the player movement data into data defining game movement for the at least one game component; and 2) generating movement on the display device of the at least one game component using the data defining game movement; wherein the at least one data capture device is configured to collect player movement data associated with movement of the player's eyes.

13 Claims, 12 Drawing Sheets

(56) References Cited

U.S. PATENT DOCUMENTS

| | | | | |
|---|---|---|---|---|
| 2004/0166937 | A1* | 8/2004 | Rothschild | G07F 17/3209 463/36 |
| 2007/0259716 | A1* | 11/2007 | Mattice | G06F 3/013 463/36 |
| 2008/0300055 | A1* | 12/2008 | Lutnick | G07F 17/3209 463/39 |
| 2012/0115594 | A1* | 5/2012 | Hornik | G07F 17/34 463/27 |
| 2012/0172119 | A1* | 7/2012 | Kelly | A63F 13/00 463/31 |
| 2013/0023337 | A1* | 1/2013 | Bowers | G07F 17/32 463/25 |

* cited by examiner

904

902

SYSTEMS, METHODS AND DEVICES FOR MOVING GAME COMPONENTS IN GAMING SYSTEMS

TECHNICAL FIELD

Embodiments described herein relate to the field of electronic gaming systems, such as on-line gaming and gaming systems in casinos. The embodiments described herein particularly relate to the field of manipulating game components or interface in response to a player's body movements.

BACKGROUND OF THE INVENTION

Various video gaming systems or machines are known. These may consist of slot machines, online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. One type of game displays a plurality of moving arrangements of gaming elements (such as reels, and symbols on reels), and one or more winning combinations are displayed using a pattern of gaming elements in an arrangement of cells (or an "array"), where each cell may include a gaming element, and where gaming elements may define winning combinations (or a "winning pattern").

Games that are based on winning patterns may be referred to as "pattern games" in this disclosure.

One example of a pattern game is a game that includes spinning reels, where a user wagers on one or more lines, activates the game, and the spinning reels are stopped to show one or more patterns in an array. The game rules may define one or more winning patterns of gaming elements, and these winning patterns may be associated with credits, points or the equivalent.

Another example type of game may be a maze-type game where the player may navigate a virtual character through a maze for prizes.

A further example type of game may be a navigation-type game where a player may navigate a virtual character to attempt to avoid getting hit by some moving or stationary objects and try to contact other moving or stationary objects.

Gaming systems or machines of this type are popular, however, there is a need to compete for the attention of users, and therefore it is necessary to innovate by launching new, engaging game features.

SUMMARY OF THE INVENTION

There are described systems, devices, and methods for generating movement of game components or aspects of the game in a gaming system. A computer-implemented systems, devices, and methods for moving game components in a gaming system may involve tracking player movements and transforming player movement data into data defining movement for a game. The player movements may relate to eye movements, body movements, or gestures by the player. The movement for a game may be change in views, movement of gaming components or objects, navigational movement for virtual characters or avatars, and so on.

In accordance with a broad aspect, embodiments described herein relate to computer-implemented devices, systems and method for moving game components that may involve displaying game components using various three-dimensional enhancements. The gaming surface may be provided as a three-dimensional environment with various points of view. The devices, systems and method may involve tracking player movement and updating the three-dimensional point of view based on the tracked player movement. The devices, systems and method may involve tracking player movement and updating three-dimensional objects, virtual characters or avatars, gaming components, or other aspects of the gaming surface in response. For example, the devices, systems and method may involve tracking a player's eyes so that when the eyes move the virtual characters, gaming components, gaming surface, or other object moves in response. The player may navigate virtual characters through a game with body and eye movements. Tracking the player's may manipulate gaming objects based on body and eye movements. The player's movements may also relate to particular gestures.

In accordance with some embodiments, the three-dimensional enhancement may involve displaying multi-faceted game components as a three dimensional configuration. The devices, systems and method may involve tracking player movement, including eye movements, and rotating the multi-faceted game components in response to tracked movement. The rotation may be on different axis, such as vertical, horizontal or at an angle to a plane of the game surface or display device. The rotation may enable a player to view facets that may be hidden from a current view. The devices, systems and method may involve tracking player movement and updating the point of view of the three-dimensional enhancement multi-faceted game components in response.

In accordance with some embodiments, the three-dimensional enhancement may involve one or more additional game components that combine or merge to create an additional game symbol. The additional game symbol may provide bonus features, other another special symbol. The devices, systems and method may involve tracking player movement (e.g. eye movement) and moving or otherwise manipulating the additional game components in response. The devices, systems and method may involve tracking player movement and updating the point of view of the three-dimensional enhancement involving the merged symbols.

In accordance with some embodiments, the three-dimensional enhancement may involve a three dimensional shape that contacts one or more original symbols and integrates additional game components stacked behind the one or more original symbols. The devices, systems and method may involve tracking player movement and updating the point of view of the three-dimensional enhancement involving the shape in response.

In accordance with some embodiments, the three-dimensional enhancement may involve transparent areas to integrate additional game components stacked behind the transparent areas. The devices, systems and method may involve tracking player movement and navigating the view to see through the transparent areas in response.

In accordance with some embodiments, the three-dimensional enhancement may involve a multi-faceted gaming surface that may rotate to reveal and hide different gaming surfaces. The devices, systems and method may involve tracking player movement and rotating the multi-faceted gaming surface in response to see different gaming surfaces that may be hidden from the current view. The rotation may be on multiple axes. The devices, systems or methods may further involve running multiple instances of a given game in parallel on different surfaces of the multi-faceted gaming surface.

In accordance with some embodiments, the three-dimensional enhancement may involve stacked symbols. The stacked symbols may be on multi-faceted game components and the devices, systems and method may involve tracking player movement and rotating the view of the multi-faceted game components in response to see different facets that may be hidden from the current view. The rotation may be on multiple axes. A three-dimensional enhancement may involve stacking symbols on the Z-axis to provide a cascading effect for symbols involved in winning combinations. Tracking player movement may trigger a change in view of the stack to see different symbols at lower levels of the stack.

In accordance with some embodiments, the devices, systems or methods may further involve expanding selected ones of the game components comprises providing the at least one additional symbol at least one of parallel, perpendicular, and at an angle with the original symbol. The view of the additional symbol may be manipulated using the tracked player movement.

In accordance with some embodiments, a computer device for moving game components is provided. The computer device comprises: at least one data storage device to store game data for a game; a display device to display via a user interface at least one three-dimensional game component of the game in accordance with a set of game rules using the game data; at least one data capture device to collect player movement data, wherein the player movement data defines movement of a player of the game, wherein the data capture device may include a camera, a sensor or other data capture electronic hardware; and at least one processor configured to: 1) transform the player movement data into data defining game movement for the at least one game component; and 2) generating movement on the display device of the at least one game component using the data defining game movement; wherein the at least one data capture device is configured to collect player movement data associated with movement of the player's eyes.

In accordance with some embodiments, the at least one data capture device is configured to collect player movement data associated with movement of the player's head.

In accordance with some embodiments, there is provided at least one data capture device is configured to collect player movement data associated with movement of a part of the player's body.

In accordance with some embodiments, at least one data capture device is configured to collect player movement data associated with a gesture by the player.

In accordance with some embodiments, the at least one data capture device is configured to collect additional player movement data, wherein the player movement data defines additional movement of the player of the game; and wherein the at least one processor is configured to transform the additional player movement data into additional data defining game movement for the at least one game component, and generate additional movement on the display device of the at least one game component using the additional data defining game movement.

In accordance with some embodiments, the game is a navigation type game, and wherein the at least one game component comprises a virtual avatar that is navigated in the game using the player movement data to avoid obstacles and collect rewards.

In accordance with some embodiments, the game is a maze type game, and wherein the at least one game component comprises a virtual avatar that is navigated through a maze using the player movement data.

In accordance with some embodiments, the movement comprises at least one of: rotation about an axis, left, right, up, down, and a combination thereof.

In accordance with some embodiments, the at least one display device is configured to update a display of a view of the game using the data defining game movement.

In accordance with some embodiments, the at least one game component comprises: a virtual character, a gaming symbol, a stack of game components along an axis orthogonal to a plane of the display device, a multi-faceted game component, a reel, a grid, and a multi-faceted gaming surface.

In accordance with some embodiments, a computer-implemented method for moving game components in a gaming system is provided, the method comprising: displaying on a display device via a user interface at least one three-dimensional game component of a game in accordance with a set of game rules for the game; collecting player movement data using a camera or a sensor, wherein the player movement data defines movement of a player of the game; transforming, using a processor, the player movement data into data defining game movement for the at least one game component; and generating movement on the display device of the at least one game component using the data defining game movement, wherein the collected player movement data comprises data associated with movement of the player's eyes.

In accordance with some embodiments, the computer-implemented method further comprises collecting player movement data associated with movement of the player's head.

In accordance with some embodiments, the computer-implemented method further comprises collecting player movement data associated with movement of a part of the player's body.

In accordance with some embodiments, the computer-implemented method further comprises: collecting player movement data associated with a gesture by the player.

In accordance with some embodiments, the computer-implemented method further comprises: collecting additional player movement data using a camera or sensor, wherein the player movement data defines additional movement of the player of the game; transforming the additional player movement data into additional data defining game movement for the at least one game component; and generating additional movement on the display device of the at least one game component using the additional data defining game movement.

In accordance with some embodiments, the game is a navigation type game, and wherein the at least one game component comprises a virtual avatar that is navigated in the game using the player movement data to avoid obstacles and collect rewards.

In accordance with some embodiments, the game is a maze type game, and wherein the at least one game component comprises a virtual avatar that is navigated through a maze using the player movement data.

In accordance with some embodiments, the movement comprises at least one of: rotation about an axis, left, right, up, down, and a combination thereof.

In accordance with some embodiments, the computer-implemented method further comprises updating a view of the game using the data defining game movement.

In accordance with some embodiments, the at least one game component comprises: a virtual character, a gaming symbol, a stack of game components along an axis orthogonal to a plane of the display device, a multi-faceted game component, a reel, a grid, and a multi-faceted gaming surface.

Features of the systems, devices, and methods described herein may be used in various combinations, and may also be used for the system and computer-readable storage medium in various combinations.

In this specification, the term "game component" or game element is intended to mean any individual element which when grouped with other elements will form a layout for a game. For example, in card games such as poker, blackjack, and gin rummy, the game components may be the cards that form the player's hand and/or the dealer's hand, and cards that are drawn to further advance the game. As a further example, in navigational games the game components may be moving or stationary objects to avoid or hit to achieve different game goals. In a maze game, the game components may be walls of the maze, objects within the maze, features of the maze, and so on. In a traditional Bingo game, the game components may be the numbers printed on a 5×5 matrix which the players must match against drawn numbers. The drawn numbers may also be game components. In a spinning reel game, each reel may be made up of one or more game components. Each game component may be represented by a symbol of a given image, number, shape, color, theme, etc. Like symbols are of a same image, number, shape, color, theme, etc. Other embodiments for game components will be readily understood by those skilled in the art.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
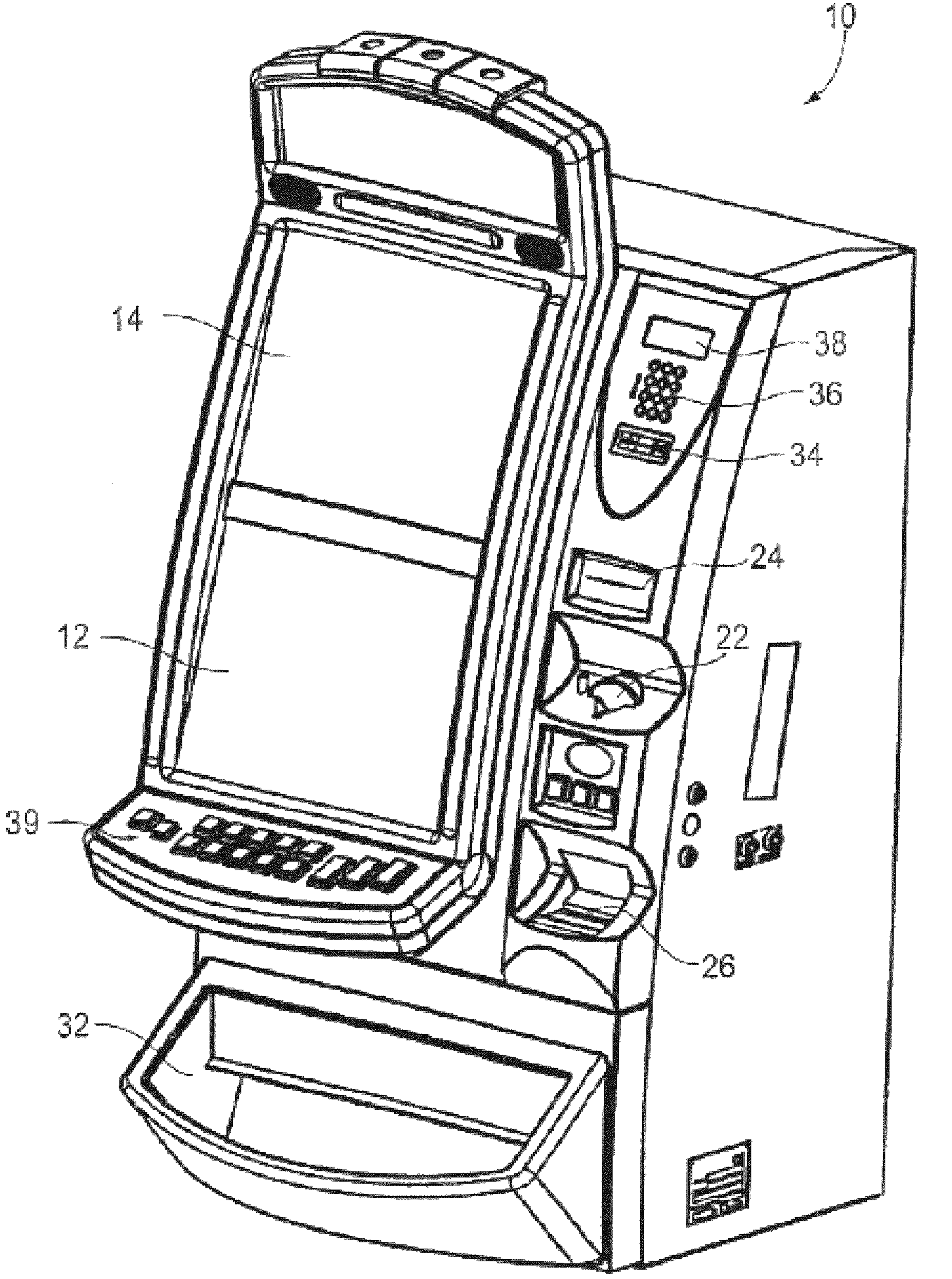
FIG. 1 is a perspective view of an electronic gaming machine for implementing the gaming enhancements, in accordance with one embodiment.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, gaming machine, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data for tracking player movements using receivers and sensors, transmit player movement data using transmitters, and transform electronic data signals for various three dimensional enhancements using particularly configured processors to modify the display of the three dimensional enhancements on three dimensional adapted display screens in response to the tracked player movements. That is, tracked player movements may result in manipulation and movement of various three dimensional features of a game.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The gaming enhancements described herein may be carried out using any type of computer, including portable devices, such as smart phones, that can access a gaming site or a portal (which may access a plurality of gaming sites) via the internet or other communication path (e.g., a LAN or WAN). Embodiments described herein can also be carried out using an electronic gaming machine (EGM) in various venues, such as a casino. One example type of EGM is described with respect to FIG. 1.

FIG. 1 is a perspective view of an EGM 10 where the three-dimensional enhancements to game components may be provided. EGM 10 includes a display 12 that may be a thin film transistor (TFT) display, a liquid crystal display (LCD), a cathode ray tube (CRT), auto stereoscopic three dimensional display and LED display, an OLED display, or any other type of display. A second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12/14 may also include a camera.

Display 12 or 14 may have a touch screen lamination that includes a transparent grid of conductors. Touching the screen may change the capacitance between the conductors, and thereby the X-Y location of the touch may be determined. The processor associates this X-Y location with a function to be performed. Such touch screens may be used for slot machines. There may be an upper and lower multi-touch screen in accordance with some embodiments.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the gaming machine 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. The card reader reads the inserted card for player and credit information for cashless gaming. The card reader may read a magnetic code on a conventional player tracking card, where the code uniquely identifies the player to the host system. The code is cross-referenced by the host system to any data related to the player, and such data may affect the games offered to the player by the gaming terminal. The card reader may also include an optical reader and printer for reading and printing coded barcodes and other information on a paper ticket. A card may also include credentials that enable the host system to access one or more accounts associated with a user. The account may be debited based on wagers by a user and credited based on a win. Alternatively, an electronic device may couple (wired or wireless) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be a input device such as a touchscreen, or dynamic digital button panel, in accordance with some embodiments.

Player control buttons 39 may include any buttons or other controllers needed for the play of the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

The EGM 10 may also include hardware configured to provide motion tracking. An example type of motion tracking is optical motion tracking. The motion tracking may include a body and head controller. The motion tracking may also include an eye controller. The EGM 10 may implement eye-tracking recognition technology using a camera, sensors (e.g. optical sensor), data receivers and other electronic hardware. Players may move side to side to control the game and game components. For example, the EGM 10 is configured to track player's eyes, so when the eyes move left, right, up or down, a character or symbol on screen moves in response to the player's eye movements. In a navigational game, the player may have to avoid obstacles, or possibly catch items to collect. The virtual movements may be based on the tracking recognition data.

The EGM 10 may include a camera. The camera may be used for motion tracking of player, such as detecting player positions and movements, and generating signals defining x, y and z coordinates. For example, the camera may be used to implement tracking recognition techniques to collect tracking recognition data. As an example, the tracking data may relate to player eye movements. The eye movements may be used to control various aspects of a game or a game component. The camera may be configured to track the precise location of a player's left and/or right eyeballs in real-time or near real-time as to interpret and record the player's eye movement data. The eye movement data may be one way of defining player movements.

For example, the recognition data defining player movement may be used to manipulate or move game components. As another example, the recognition data defining player movement may be used to change a view of the gaming surface or gaming component. A viewing object of the game may be illustrated as a three-dimensional enhancement coming towards the player. Another viewing object of the game may be illustrated as a three-dimensional enhancement moving away from the player. The players head position may be used as a view guide for the viewing camera during a three-dimensional enhancement. A player sitting directly in front of display 12 may see a different view than a player moving aside. The camera may also be used to detect occupancy of the machine.

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

Accordingly, EGM 10 is particularly configured for moving game components. The display screens 12, 14 may display via a user interface three-dimensional game components of a game in accordance with a set of game rules using game data, stored in a data storage device.

At least one data capture device collects player movement data, where the player movement data defines movement of a player of the game. The data capture device may include a camera, a sensor or other data capture electronic hardware. The EGM 10 may include at least one processor configured to transform the player movement data into data defining game movement for the at least one game component, and generate movement on the display device of the at least one game component using the data defining game movement.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

As described herein, EGM 10 may be configured to provide three dimensional enhancements to game components. The three dimensional enhancements may be provided dynamically as dynamic game content in response to electronic data signals relating to tracking recognition data collected by EGM 10.

The EGM 10 may include a display with multi-touch and auto stereoscopic three-dimensional functionality, including a camera, for example. The EGM 10 may also include several effects and frame lights. The three dimensional enhancements may be three dimensional variants of gaming components. For example, the three dimensional variants may not be limited to a three dimensional version of the gaming components.

EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also include a digital button panel. The digital button panel may include various elements such as for example, a touch display, animated buttons, frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The EGM 10 may also include physical buttons.

The EGM 10 may include frame and effect lights. The lights may be synchronized with enhancements of the game. The EGM 10 may be configured to control color and brightness of lights. Additional custom animations (color cycle, blinking, etc.) may also be configured by the EGM 10. The customer animations may be triggered by certain gaming events.

Figure 2A:
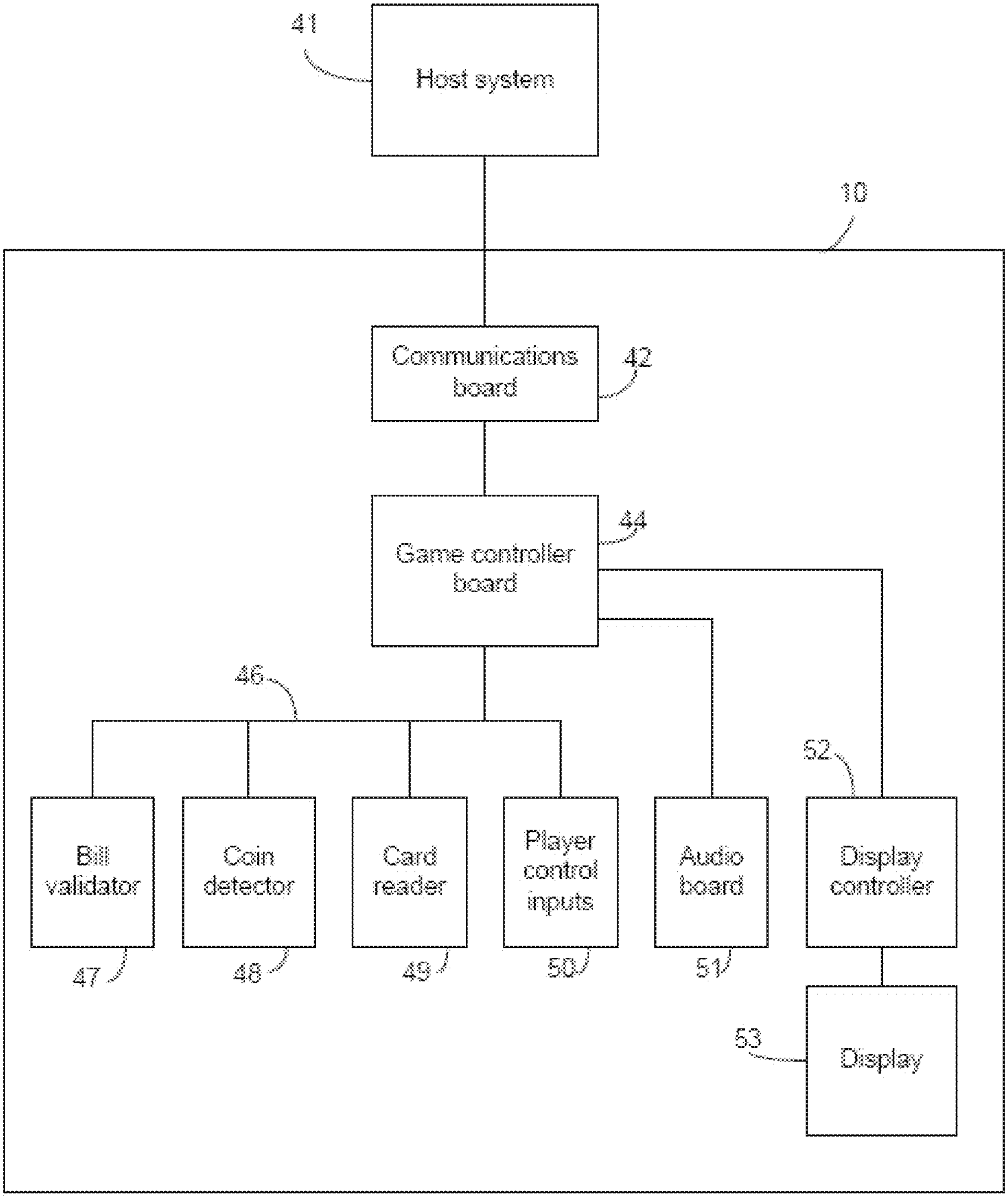
FIG. 2*a* is a block diagram of an electronic gaming machine linked to a casino host system, in accordance with one embodiment.
Figure 2B:
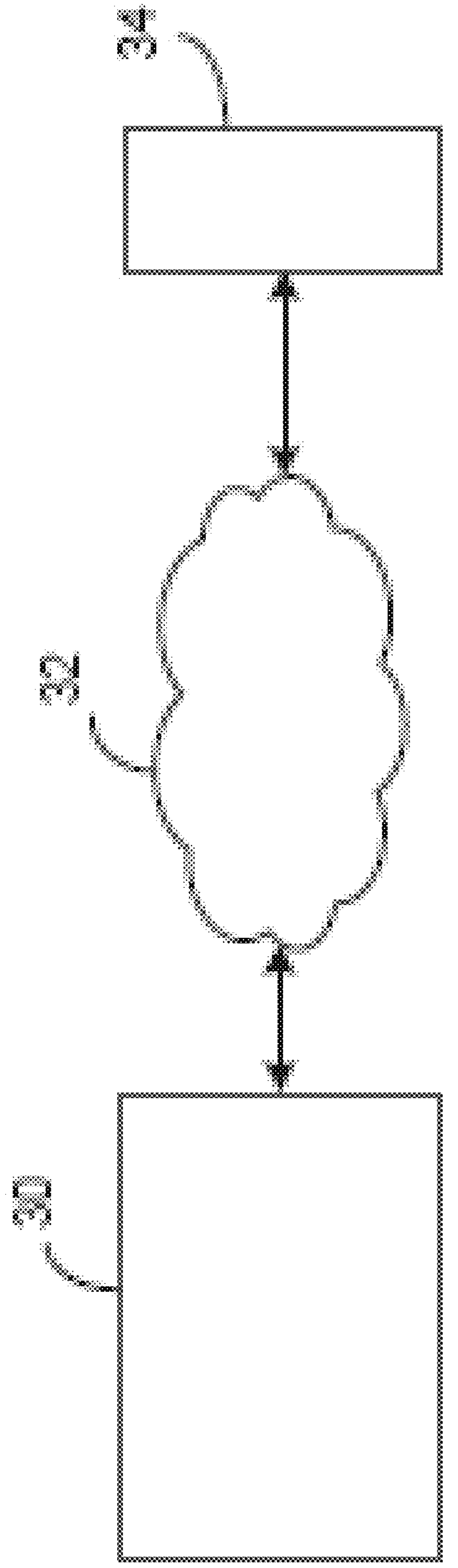
FIG. 2*b* is an exemplary online implementation of a computer system and online gaming system.

FIG. 2*a* is a block diagram of EGM 10 linked to the casino's host system 41. The EGM 10 may use conventional hardware. FIG. 2*b* illustrates a possible online implementation of a computer system and online gaming device in accordance with the present gaming enhancements. For example, a server computer 34 may be configured to enable online gaming in accordance with embodiments described herein. One or more users may use a computing device 30 that is configured to connect to the Internet 32 (or other network), and via the Internet 32 to the server computer 34 in order to access the functionality described in this disclosure. The server computer 34 may include a movement recognition engine that may be used to process and interpret collected player movement data, to transform the data into data defining manipulations of game components or view changes.

A communications board 42 may contain conventional circuitry for coupling the EGM 10 to a local area network (LAN) or other type of network using any suitable protocol, such as the G2S protocols. Internet protocols are typically used for such communication under the G2S standard, incorporated herein by reference. The communications board 42 transmits using a wireless transmitter, or it may be directly connected to a network running throughout the casino floor. The communications board 42 basically sets up a communication link with a master controller and buffers data between the network and the game controller board 44. The communications board 42 may also communicate with a network server, such as in accordance with the G2S standard, for exchanging information to carry out embodiments described herein.

The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen). Other peripherals may be one or more cameras used for collecting eye-tracking recognition data, or other player movement recognition data.

The game controller board 44 may also control one or more devices that produce the game output including audio and video output associated with a particular game that is presented to the user. For example audio board 51 may convert coded signals into analog signals for driving speakers. A display controller 52, which typically requires a high data transfer rate, may convert coded signals to pixel signals for the display 53. Display controller 52 and audio board 51 may be directly connected to parallel ports on the game controller board 44. The electronics on the various boards may be combined onto a single board.

Computing device 30 may be particularly configured with hardware and software to interact with gaming machine 10 or gaming server 34 via network 32 to implement gaming functionality and render three dimensional enhancements, as described herein. For simplicity only one computing device 30 is shown but system may include one or more computing devices 30 operable by users to access remote network resources. Computing device 30 may be implemented using one or more processors and one or more data storage devices configured with database(s) or file system(s), or using multiple devices or groups of storage devices distributed over a wide geographic area and connected via a network (which may be referred to as "cloud computing").

Computing device 30 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

Computing device 30 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 30 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device 30 may include one or more input devices, such as a keyboard, mouse, camera, touch screen and a microphone, and may also include one or more output devices such as a display screen (with three dimensional capabilities) and a speaker. Computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Computing device 30 is operable to register and authenticate users (using a login, unique identifier, and password for example) prior to providing access to applications, a local network, network resources, other networks and network security devices. Computing device 30 may serve one user or multiple users.

Figure 3:
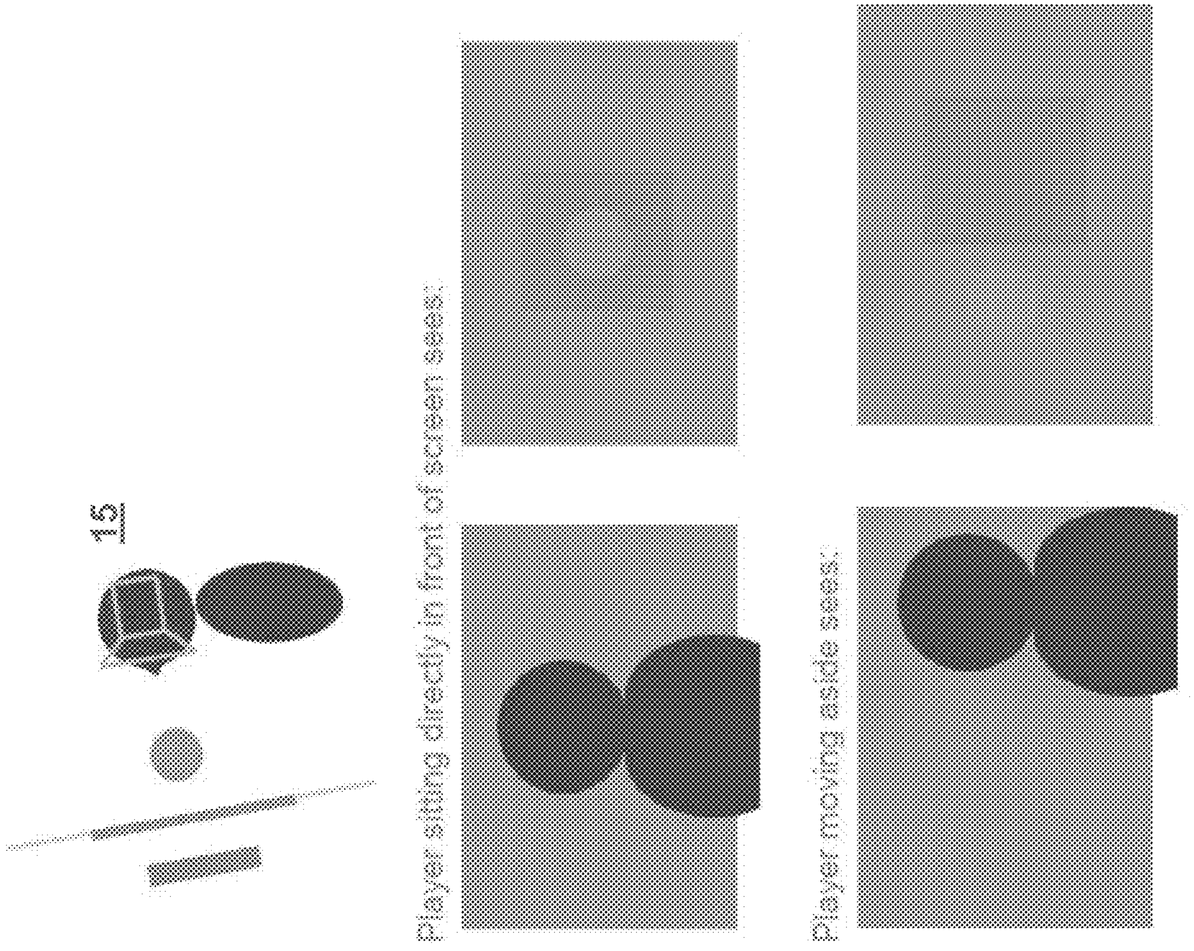
FIG. 3 illustrates an electronic gaming machine with a camera for implementing the gaming enhancements, in accordance with some embodiments.

FIG. 3 illustrates an electronic gaming machine with a camera 15 for implementing the gaming enhancements, in accordance with some embodiments. The EGM 10 may include the camera 15, sensors (e.g. optical sensor), or other hardware device configured to capture and collect data relating to player movement.

In accordance with some embodiments, the camera 15 may be used for motion tracking, and movement recognition. The camera 15 may collect data defining x, y and z coordinates representing player movement.

In some examples, a viewing object of the game (shown as a circle in front of the base screen) may be illustrated as a three-dimensional enhancement coming towards the player. Another viewing object of the game (shown as a rectangle behind the base screen) may be illustrated as a three-dimensional enhancement moving away from the player. The players head position may be used as a view guide for the viewing camera during a three-dimensional enhancement. A player sitting directly in front of display 12 may see a different view than a player moving aside. The camera 15 may also be used to detect occupancy of the machine. The camera 15 and/or a sensor (e.g. an optical sensor) may also be configured to detect and track the position(s) of a player's eyes or more precisely, pupils, relative to the screen of the EGM 10.

The camera 15 may also be used to collect data defining player eye movement, gestures, head movement, or other body movement. Players may move side to side to control the game. The camera 15 may collect data defining player movement, process and transform the data into data defining game manipulations (e.g. movement for game components), and generate the game manipulations using the data. For example, player's eyes may be tracked by camera 15 (or another hardware component of EGM 10), so when the eyes move left, right, up or down, their character or symbol on screen moves in response to the player's eye movements. The player may have to avoid obstacles, or possibly catch or contact items to collect depending on the type of game. These movements within the game may be directed based on the data derived from collected movement data.

In one embodiment of the invention, the camera 15 is coupled with an optical sensor to track a position of a player's each eye relative to a center of a EGM 10's screen, as well as a focus direction and a focus point on the EGM 10's screen of the player's both eyes in real-time or near real-time. The focus direction can be the direction at which the player's line of sight travels or extends from his or her eyes to the EGM 10's screen. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

Figure 4:
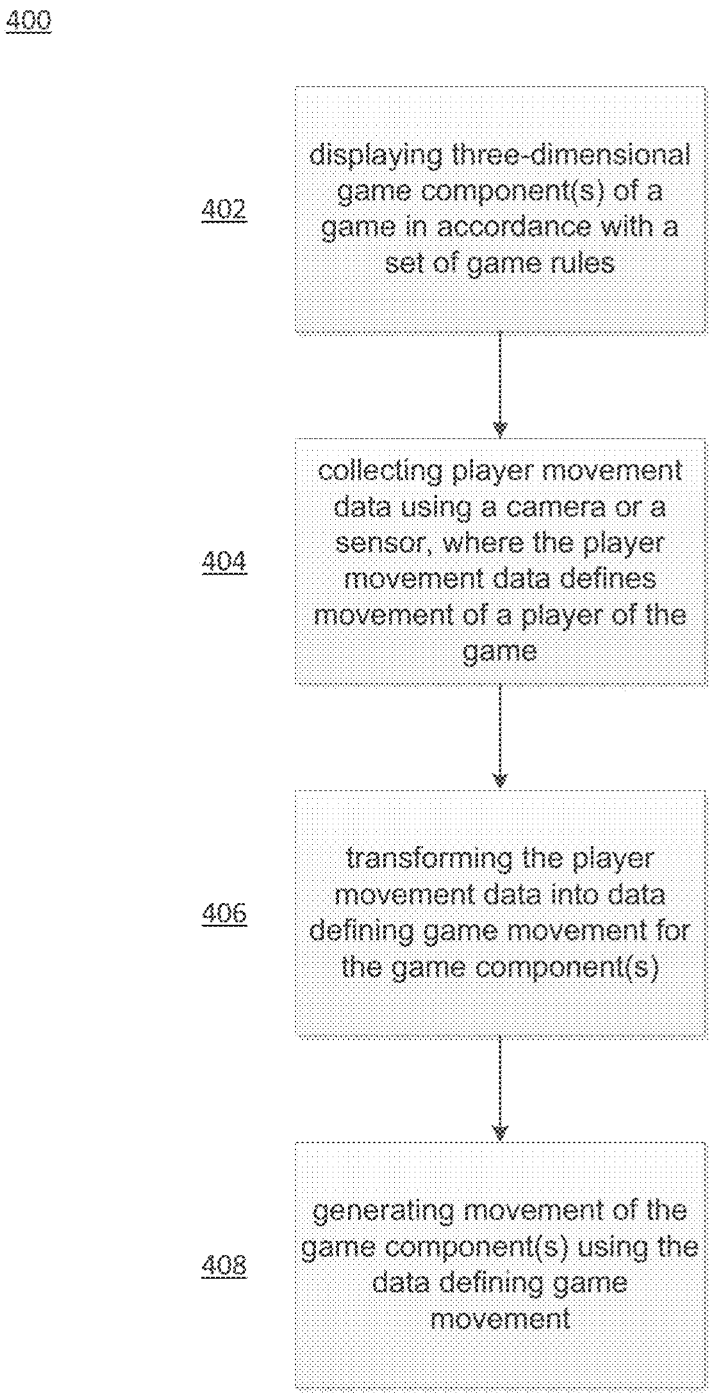
FIG. 4 illustrates a flowchart diagram of an exemplary computer-implemented method for the game component enhancements.

Referring now to FIG. 4, there is shown a flowchart diagram of an exemplary computer-implemented method 400 for moving game component in a gaming system such as that illustrated in FIGS. 1, 2*a*, and 2*b*.

At 402, the EGM 10 displays on a display device, such as display 12, 14, a user interface showing one or more three-dimensional game components of a game in accordance with a set of game rules for the game. The game component may be a virtual character, a gaming symbol, a stack of game components along an axis orthogonal to a plane of the display device, a multi-faceted game component, a reel, a grid, a multi-faceted gaming surface, and gaming surface, or a combination thereof.

A game component may be selected to move or manipulate with the player's eye movements. The gaming component may be selected by the player or by the game. For example, the game outcome or state may determine which symbol to select for enhancement.

At 404, a data capture device collects player movement data, where the player movement data defines movement of the player. The data capture device may be a camera, a sensor, and/or other hardware device configured to capture and collect data relating to player movement. The data capture device may integrally connect to EGM 10 or may be otherwise coupled thereto.

As previously described, the camera 15 may be coupled with an optical sensor to track a position of a player's each eye relative to a center of a EGM 10's screen, as well as a focus direction and a focus point on the EGM 10's screen of the player's both eyes in real-time or near real-time. The focus direction can be the direction at which the player's line of sight travels or extends from his or her eyes to the EGM 10's screen. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the EGM 10's screen directly connected by a (virtual) line of sight extending from the eyes of a player. This foveal area in the player's vision generally appears to be in sharp focus and may include one or more game components and the surrounding area. In this disclosure, it is understood that a focus point may include the foveal area immediately adjacent to the fixation point directly connected by the (virtual) line of sight extending from the player's eyes.

The player movement data may relate to the movement of the player's eyes. For example, the player's eyes may move or look to the left which may trigger a corresponding movement of a game component within the game. The movement of the player's eyes may also trigger an updated view of the entire game on display to reflect the orientation of the player in relation to the display device. The player movement data may also be associated with movement of the player's head, or other part of the player's body. As a further example, the player movement data may be associated with a gesture made by the player, such as a particular hand or finger signal.

At 406, a processor of EGM 10 (e.g. coupled thereto or part thereof) may transform the player movement data into data defining game movement for the game component(s).

At 408, the processor generates movement of the game component(s) using the data defining game movement. The display device updates to visually display the movement of the game component(s) for the player. The movement may be a rotation about an axis, or directional movement (e.g. left, right, up, down), or a combination thereof. The movement may also be an update a view of the game on the display using the data defining game movement.

Accordingly, the EGM 10 is configured to monitor and track player movement including eye movement data, and in response generate corresponding movements of the game component(s). The EGM 10 (e.g. processor) may be programmed with control logic to map different player movements to different movements of the game component(s).

In one embodiment of the invention, the EGM 10 may be configured to target, select, deselect, move, or rotate one or more game components based on player movement data such as eye movement data. For example, if the EGM 10 determines that a player has gazed at (e.g. the focus point has remained more or less constant) a previously unselected game component for three or more seconds, then the EGM 10 can select or highlight the game component, so the player may know that he or she can proceed to move or rotate the selected or highlighted game component. In another example, if the EGM 10 determines that after a player has selected a game component, the same player has moved his or her eyes to the right on a horizontal level for a predetermined length or period of time, then the EGM 10 may cause the selected game component to move to the right as well on a horizontal level. Similarly, if the EGM 10 determines that the player has moved his or her eyes down on a vertical level for a predetermined length or period of time, then the EGM 10 may cause the selected game component to move to the bottom vertically.

The method 400 may repeat to collect additional player movement data, transform the additional player movement data into additional data defining game movement for the game component(s), and generate additional movement on the display device of the game component(s) using the additional data defining game movement.

Tracking player movement may be implemented for a variety of game types. For example, the game may be a navigation type game. For example, the game component manipulated by the player's tracked movement may be a virtual avatar. The virtual avatar may be navigated in the game using the player movement data to avoid obstacles and collect rewards.

Figure 5:
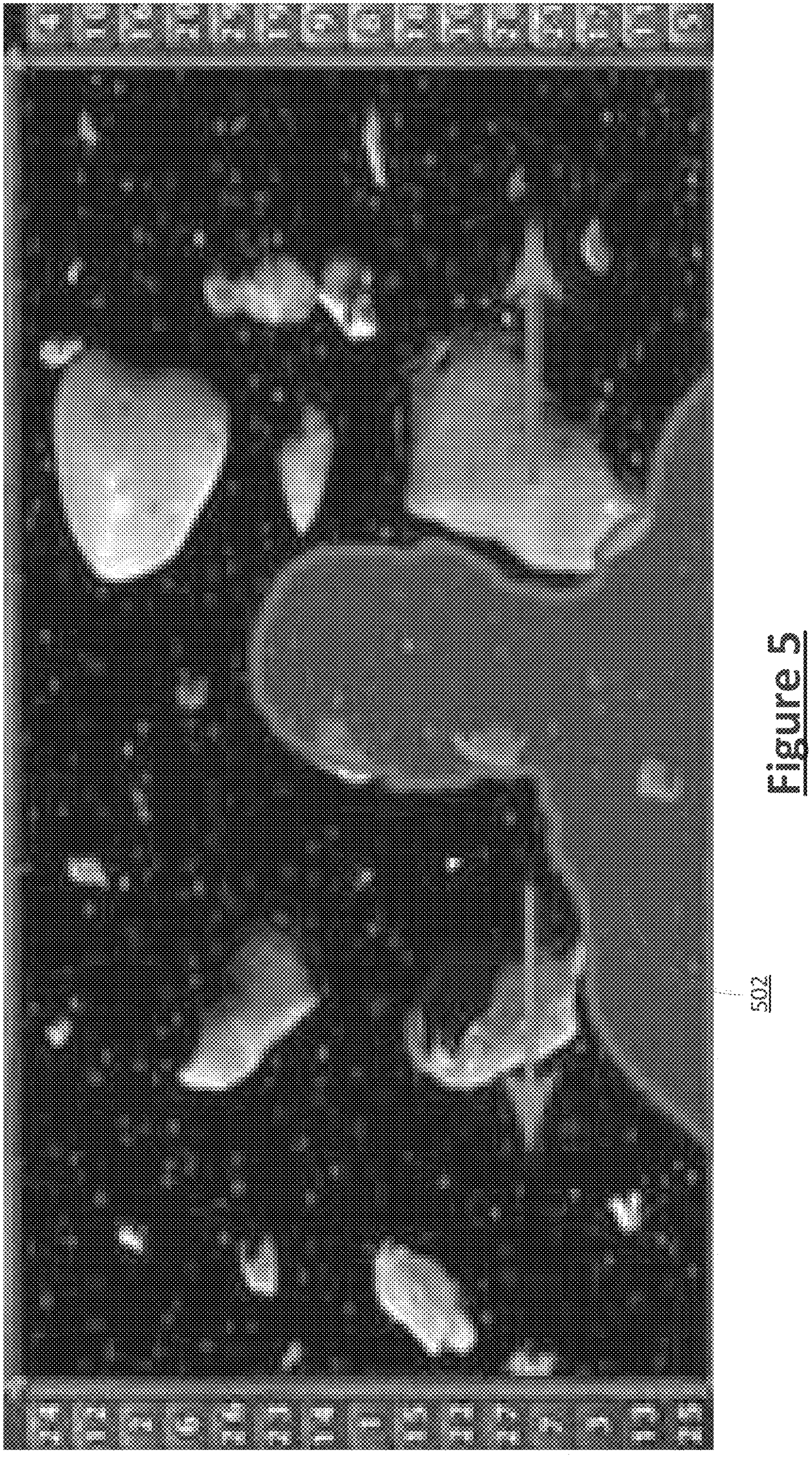
FIG. 5 illustrates a screen shot of a navigation type game where player movement tracking trigger movements of game components.

Referring now to FIG. 5, there is shown a navigation type game where player movement tracking trigger movements of game components.

As an example, an object of a game may be to pass through an asteroid field without getting hit by obstacles to get rewards. The player may also hit prize game components to collect prizes. The player movements may control a virtual avatar 502 representing a position of the player with respect to various obstacles or prizes. The virtual avatar 502 may move left to right in response to detected player movements (e.g. collected player movement data) to avoid obstacles in the game.

The eye recognition functionality implemented by data capture device(s) of EGM 10 may be used to track the movement of the player, or to track the intended movements of the player. The movement of the player may in turn trigger movement of the virtual avatar 502 in relation to or in response to the various obstacles (e.g. left and right movement of the virtual avatar 502).

For example, the data capture device(s) such as a camera and/or an optical sensor may detect that a player's eyes have moved to the right or left (with or without also moving his or her head) and in turn, the movement of the virtual avatar 502 may be configured to mirror the player's eye movements in real-time or near real-time.

As another example, the navigational type game may involve controlling movement of a ship over water. A silhouette of a ship may be displayed on the screen and the player's eye movements may control the ship by moving left or right.

Instead of avoiding obstacles on the display screen, a goal may be to hit or contact particular game components. As an example imagine, the game components may represent prizes coming toward the player (e.g. the virtual avatar representing a position of the player relative to the game components) on the display screen and the virtual avatar may need to move sideways to catch (e.g. hit, contact) the prizes. In one embodiment of the invention, the game components may be visual representations of bonus rounds or bonus prizes, which upon contact with the virtual avatar may be awarded to the player.

As another example, the game may be a maze type game. The game component(s) may include a virtual avatar that is navigated through a maze using the player movement data.

Figure 6:
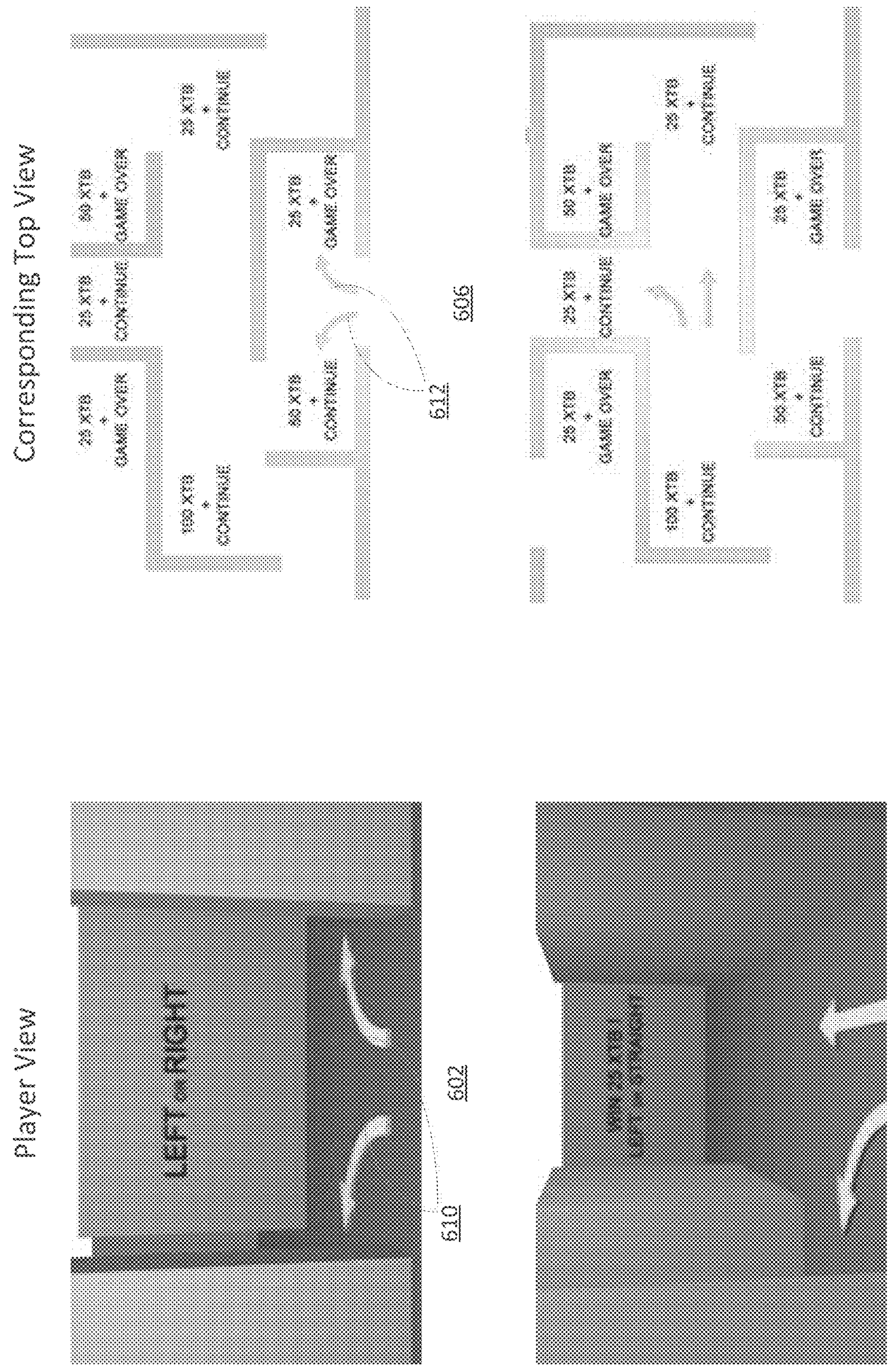
FIG. 6 illustrates a screen shot of an example maze type game.

Referring now to FIG. 6 there is shown an example maze type game.

The display device may be configured to display the maze type game within a three-dimensional environment. An example may be a first person maze-type game where the player could choose which way to go at one or more turns. Eye-tracking technology can allow the player to slightly peek around corners or above walls. The view of the maze game may change or move in response to the eye movements of the player.

FIG. 6 illustrates two example three-dimensional player views 602, 604. FIG. 6 further illustrates two corresponding top views 606, 608 that correspond to the player views 602, 604. For example, one player view 602 may present the player with an option to turn left or right as shown with arrows 610. The corresponding top view 606 may illustrate corresponding arrows 612 at a position in the maze corresponding to the player position in the maze game. If the player moves his or her eyes in one particular direction then the display may be updated to present to the player a peak around a corner of the maze in the corresponding direction. Player movements may also trigger movement of the virtual avatar or a first person perspective in one direction of the maze (e.g. turning left or right). Player movements may also enable the player to turn back in the event a dead end or other obstacle was encountered.

For example, when faced with an option of left or right, the player may choose to move his or her eyes quickly (e.g. for one second or less) to the left or right in order to obtain a quick peak in the corresponding direction. For another example, the player may choose to turn or tilt his or her head slightly in the same direction as the eyes when moving his or her eyes to the left or right, and thereby informing the EGM 10 of the player's intention to make a left or right turn in the maze.

For another example, the player may choose to move his or her eyes quickly up and then down to obtain a quick peak of the top view of the maze at his or her current position in the maze. The same quick peak may also be obtained by a quick tilt of the player's chin upwards.

In yet another example, staring or gazing for a predetermined length of time (e.g. three seconds with or without blinking) at a wall of the maze may reveal additional bonus symbols or other game components that have been previously hidden from view.

Accordingly, the EGM 10 configured with a data capture device may track player movements to trigger corresponding movements in a game. For example, players could move side to side to control the game and various aspects of the games (e.g. game components, current view displayed). As described, player's eyes may be tracked by the data capture device(s), so when the eyes move in any direction, including left, right, up or down, one or more gaming character or symbol on the display screen can move in response to the player's eye movement. The player may have to avoid obstacles, or possibly catch items to collect, as explained herein.

Figure 7:
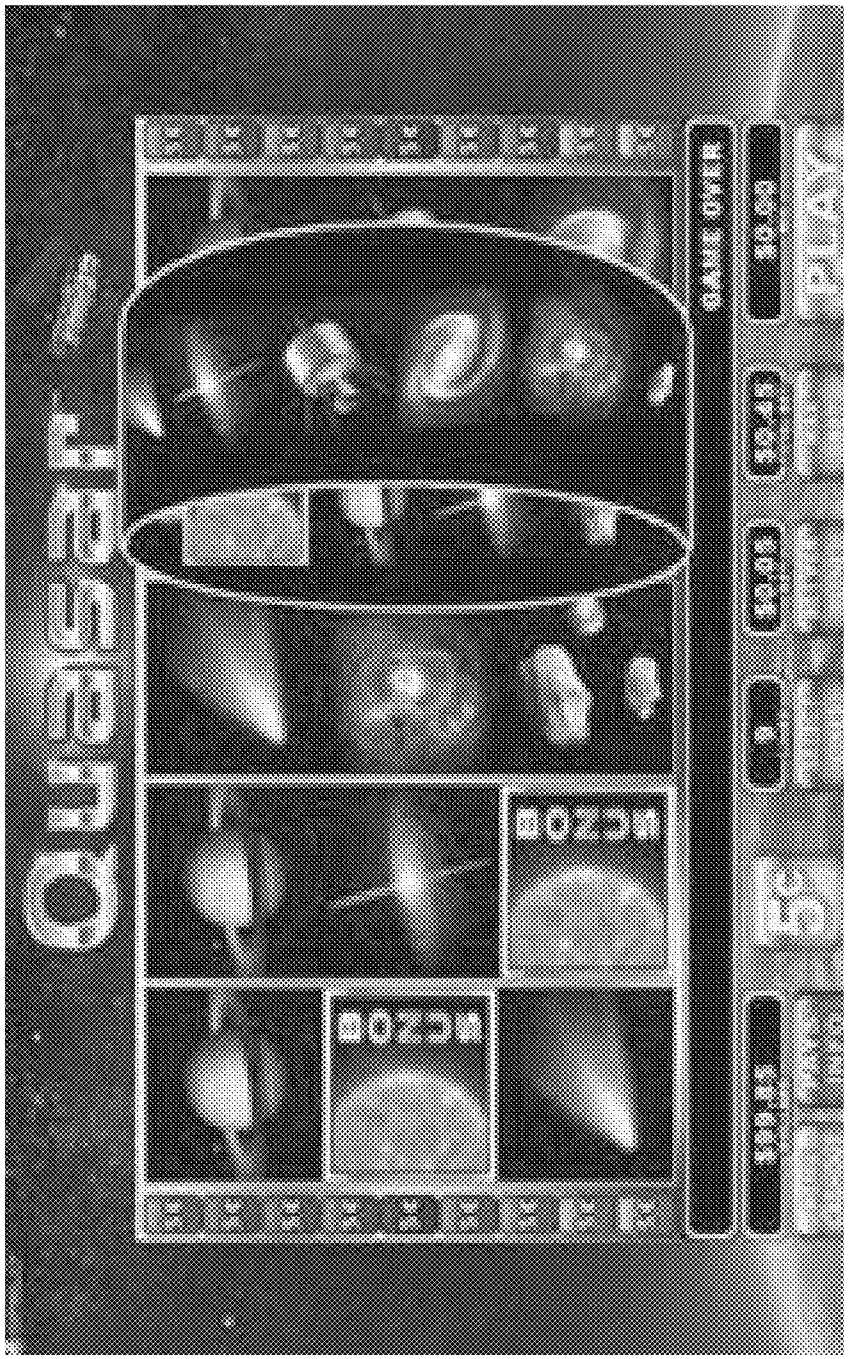
FIG. 7 illustrates a screen shot of an example three-dimensional reel game.

As another example, the game may be a reel type game. Referring now to FIG. 7 there is shown an example three-dimensional reel game. The player's eye movement may enable the player to see hidden aspects of the game surface, such as game symbols on the backside of the reel that may be hidden in a current view.

Figure 8:
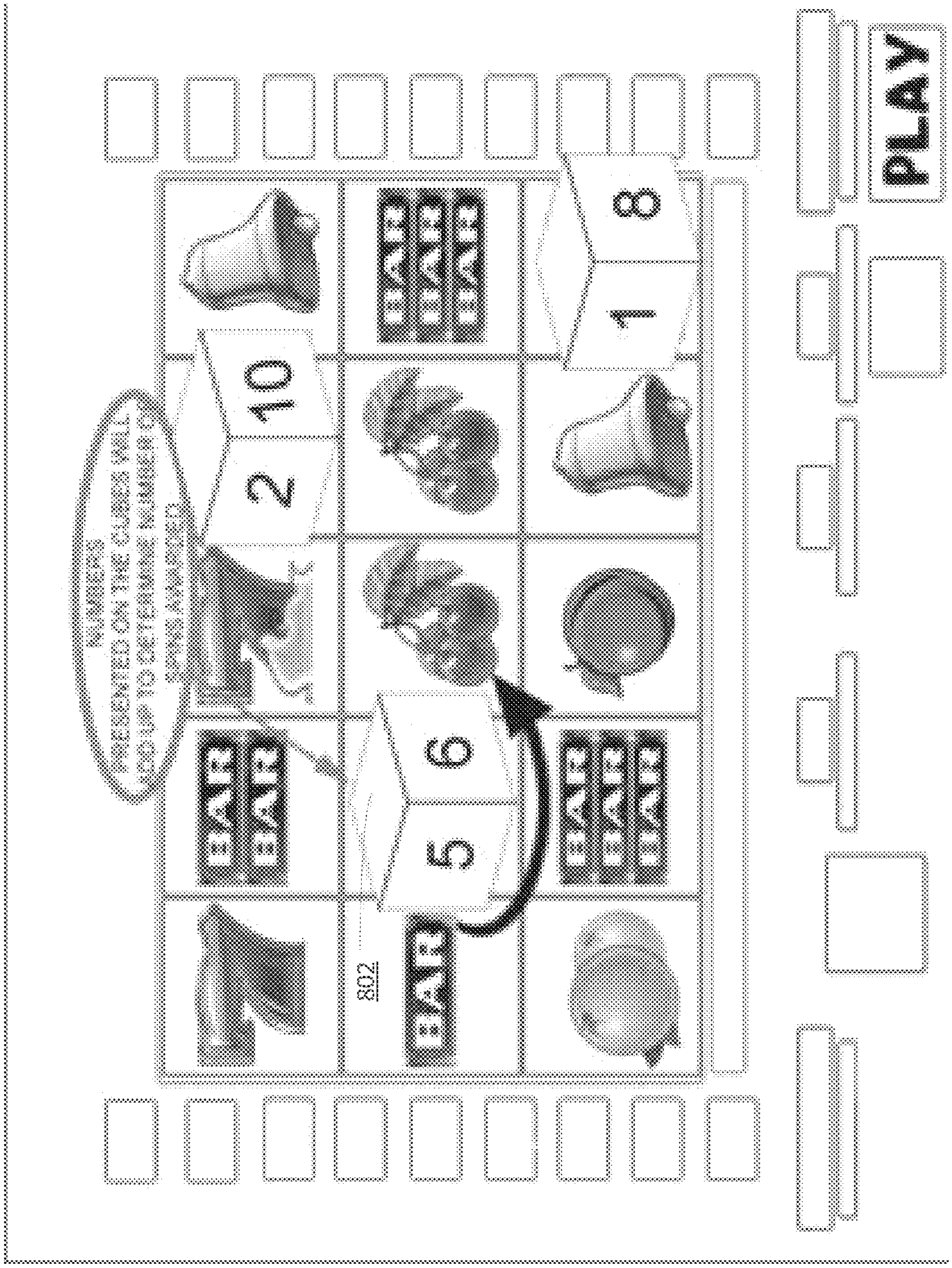
FIG. 8 illustrates a screen shot of rows and/or columns of game components displayed on a display device.

The player's eye movement may turn a game component about an axis to move or manipulate different types of game components. Referring now to FIG. 8, there is shown rows and/or columns of game components displayed on a display device, such as display devices 12, 14, along a plane, referred to herein as the gaming plane, in accordance with a gaming configuration for a given game. The row/column may be made up multi-faceted game component(s) 802 and other types of game components, depending on the game being played. Each game component has a given symbol associated thereto, which may be referred to herein as an original symbol as it represents the game component before any enhancements are provided.

In this example, a grid of five columns and three rows is displayed, resulting in 5×3=15 gaming components, illustrated as cells. An original symbol may be associated with each one of the 15 gaming components in each blank cell. In this example, three gaming components are three-dimensionally enhanced (e.g. as multi-faceted game component(s) 802). The three-dimensionally enhanced gaming component may be expanded outside of the gaming plane, formed by columns and rows, into a different plane. Additional symbols may be provided in the different faces and integrated into the original game. While the enhancement in this example is illustrated as cube, it should be understood that the shape may be variety of three-dimensional configurations.

In one exemplary embodiment, the game may be a spinning reel game. A win may be obtained whenever matching symbols are aligned vertically, horizontally, or diagonally. These are illustrative examples and there may be other patterns of winning combinations of symbols. Using the gaming component enhancement 802, any one or more of the symbols provided on the face of cube 802 may be matched with neighboring symbols to form a winning combination, thus increasing the odds of winning. How many additional symbols may be used may depend on the rules of the game. The player's eye movements may trigger movement of the cube 802 to reveal and hide different faces and game symbols.

In another exemplary embodiment, the game may be a bingo card. Similarly, anyone of the symbols may be used to form a complete row or column and result in a winning combination, thus increasing the odds of winning. Other possibilities for the matrix-type gaming enhancement may be used for various embodiments.

In another game, a gaming component may be expanded outside of the gaming plane by stacking new cells on top of the original symbol. Alternatively, the new cells may be stacked behind the original symbol. In either scenario, various embodiments are possible to integrate the additional symbols provided on cells into the original game. The player's eye movements may be used to peak at or reveal different stacked cells. For example, in a spinning reel game, anyone of the symbols in the stacked cells may be used to form a winning combination with neighboring cells. Alternatively, only the top, or visible, symbol may be matched with neighboring cells and as the game progresses, hidden symbols may be discovered (e.g. through player's eye movements) and used to further advance the game. In another embodiment, various events in the game, such as a particular movement by the player, may allow the player to see and/or use the additional hidden symbols in addition to the top or visible symbol to form winning combinations. Other scenarios are also possible. In addition, the number of stacked symbols may vary from stack to stack.

A multi-faceted game component 802 may be enhanced with a three-dimensional enhancement to define multiple faces, each associated with a game symbol. That is, a multi-faceted game component 802 may be associated with multiple symbols. The multiple symbols may be integrated into the game for increased possible winning combinations. Each may be used independently to calculate winning combinations for a given game.

Figure 9:
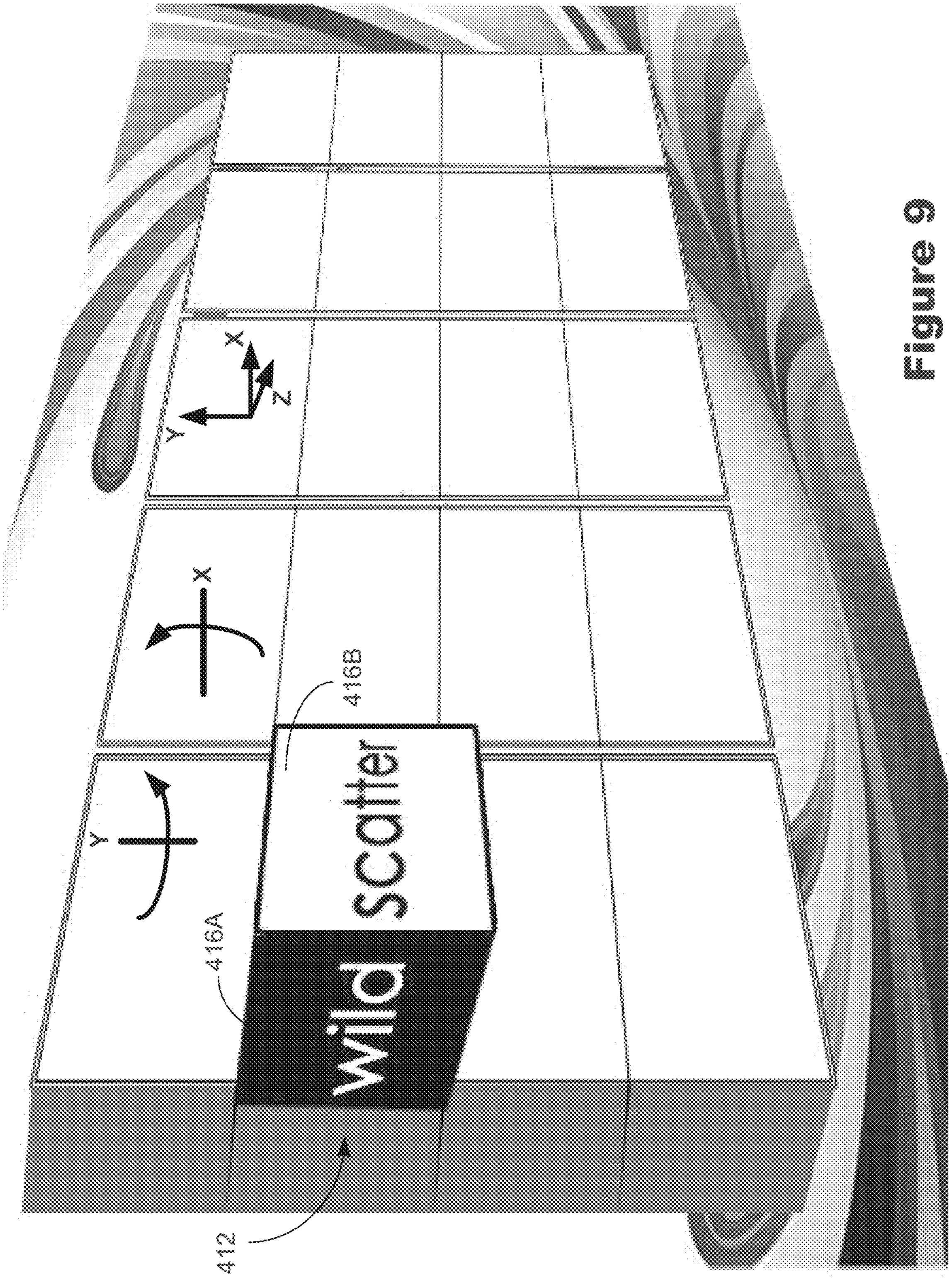
FIG. 9 illustrates a screen shot of rows and/or columns of game components displayed on a display device.

A player's eye movements may result in the multi-faceted game component 802 turning on an axis to revealing different game symbols. The player may select one or more game symbols, depending on the rules of the game, to use for winning combinations. The player's eye movements may result in the multi-faceted game component 802 turning on multiple axes to reveal different game symbols, such as a vertical or horizontal axis, or diagonal axis. An example of multiple axes of rotation is shown in FIG. 9. In this example, the multi-faceted game component 802 is a cube so the player's eye movements may turn or move the cube on different axes, depending on the rules of the game.

Accordingly, the player's eye movements may enable movement or manipulation of three-dimensional game components where certain symbols may be hidden from a current view. The player's eye movements may move the three-dimensional game components to reveal or peak at the hidden symbols.

FIG. 8 is an exemplary embodiment for an enhancement to a gaming component whereby expanding the gaming component creates a three-dimensional structure. The single facet gaming component becomes a multi-facet gaming component 802 with the enhancement. Additional symbols may be provided on one or more of the facets of the three-dimensional structure. The additional symbols may be used in various ways. For example, in a spinning reel game, as each game component is spun in a single direction, such as about the x axis, the enhanced gaming component may be spun about multiple axes, such as the y axis and/or the x axis, thus resulting in more possibilities for the spinning gaming component. The spinning may be triggered by player movements, such as an eye movement, head movement, gesture, and so on.

Various events in the game, such as a particular winning combination or reaching a threshold of points, may allow the player to freely rotate the multi-faceted gaming component in a desired direction (e.g. through tracked player movement), such that the symbol on the facet that is rotated to the front may be used for a winning combination. The symbols on the facets other than the front may be displayed to the player or hidden from view. Various events in the game may allow hidden facets to be selectively shown to the player in response to detected player movement. Other scenarios are also possible. While the multi-faceted three-dimensional structure in this example is shown to be a cube, other geometrical shapes are also possible, such as a cylinder, an octagon, and many others.

The example illustrated shows a multiple gaming components as enhanced, thus creating various effects and three dimensional variants.

Figure 10:
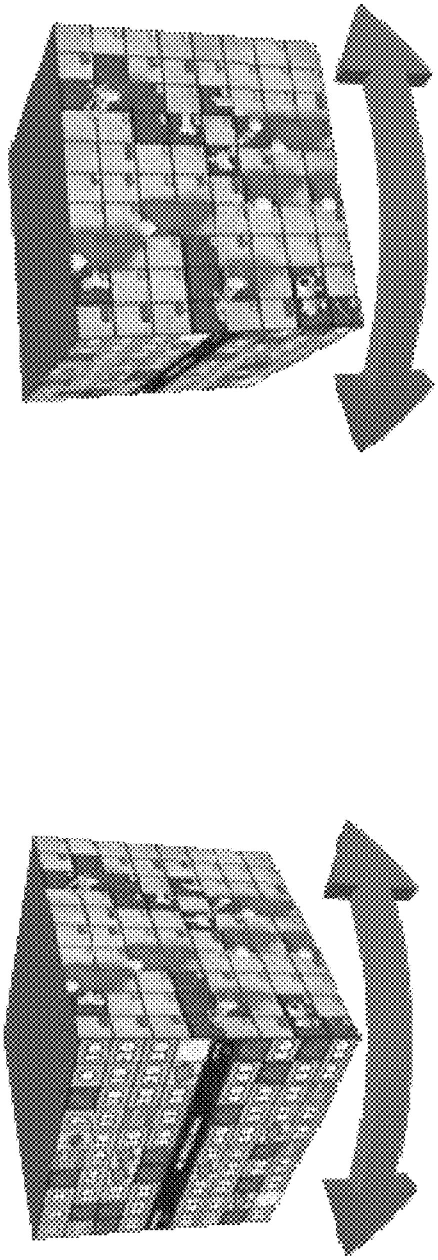
FIG. 10 illustrates a screen shot of a multi-faceted gaming surface.

In accordance with some embodiments, a game component that may be moved using a player's eye movements may be a multi-faceted gaming surface. Referring now to FIG. 10 there is shown a multi-faceted gaming surface 902, 904. The multi-faceted gaming surface allows multiple gaming instances to be run in parallel if desired. Alternatively, a single gaming instance may be run on the multi-faceted gaming surface. The player's tracked eye movement data may be used to rotate the multi-faceted gaming surface 902, 904 on one or more axes to reveal or hide different gaming surfaces. For example, one view of the multi-faceted gaming surface 902 reveals different gaming surfaces or aspects thereof than another view of the multi-faceted gaming surface 904.

In one embodiment of the invention, a player may indicate his or her intention of rotating the multi-faceted gaming surface 902 to reveal another gaming surface 904 by moving his or her eyes along a desired direction of rotation (e.g. horizontally, vertically, or 30 degrees northeast). The EGM 10 may calculate, via a camera and/or a sensor, the player's eye movements and determine the player's intention in accordance with the detected and calculated eye movement data. The EGM 10 may then be configured to rotate the multi-faceted game components accordingly in real-time or near real-time.

As indicated above, enhancing the game components may lead to the creation of three-dimensional structures. As shown, the entire gaming surface may be transformed into a multi-faceted structure. Each surface may be used as an individual and separate playing surface, thus allowing multiple gaming instances to be run simultaneously. Alternatively, the surfaces may all be used as part of a same gaming instance, with winning patterns overlapping from one surface to another via neighboring cells.

Other configurations for the gaming area are also possible. For example, multiple layers may be provided to a gaming surface. In one exemplary embodiment, once the player has a group of symbols that are all 'like' symbols, they may be removed off of the game board. Once the first layer of the game board has been removed, the next layer, which may be a different size and/or shape, is then available to be played on. Other sizes and shapes for the stacked layers may also be used.

The multi-faceted structure may be applied to any type of game matrix. The win patterns and pay categories do not have to have actual physical and traditional lines and patterns as seen in a two-dimensional video reel matrix. Grouping of like symbols may create various pay categories, as long as like symbols are touching each other on one of the facets. A game mechanic like symbol elimination may be applied, where the player is hoping to have groups of the like symbols disappearing off of the game screen and depending on the number of symbols left, there could be a prize associated. For example, if five symbols are left, the prize may be 25 credits but if there was a single symbol left, the player would be paid 1000 credits.

Figure 11:
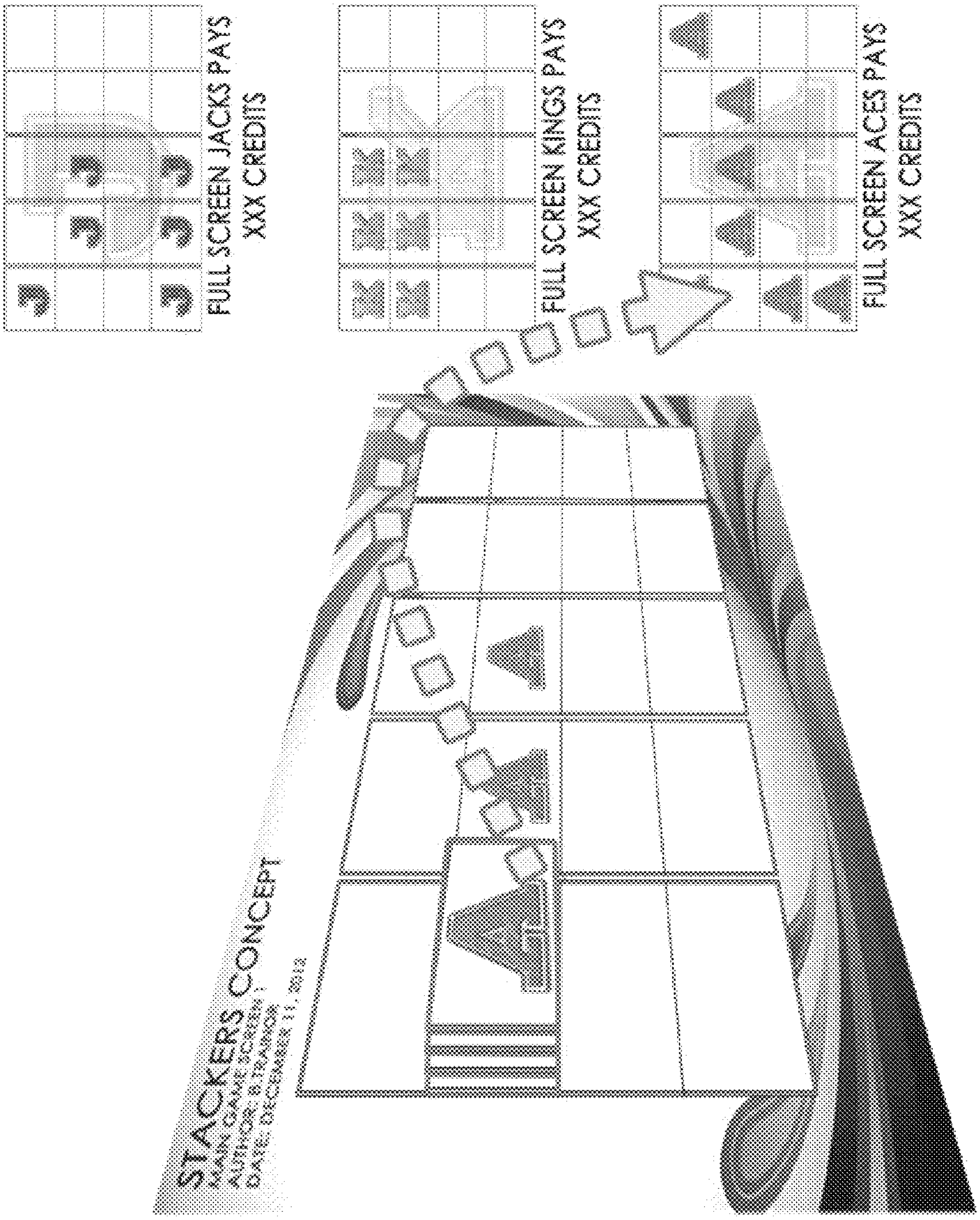
FIG. 11 illustrates an exemplary embodiment for using the stacked symbols for the purposes of a secondary game.

The use of stacking game components and symbols may also be used to create a mirrored effect on spinning reels. Various configurations may be provided using stacked symbols to obtain mirrored or asymmetrical designs. Stacking of symbols may be more or less than three symbols, having the stacks above or below the original symbol. A combination of above and below an original symbol may be used on a same gaming plane. FIG. 11 illustrated an exemplary embodiment for game play using the gaming component enhancements, and more particularly the stacking of reels in reel spinning games. The player's eye movements may be used to move stacked symbols to secondary games, for example. The player's eye movements may be used to reveal or hide different stacked symbols.

In FIG. 11, an Ace on top of reel has symbols stacked under the top Ace symbol (hidden from view). These symbols may line up on an active wagered pay pattern to then create an award to the player. The top symbols may then remove themselves from the game screen altogether, causing the second stacked symbol to be shown. The stacked cells or symbols may be used independently of the stacked symbols on top or below, as part of different winning combinations.

The screen may then be analyzed a second time to see if there are any new winning patterns available after all of the movement and replenishment that happened after the first set of symbols were removed. Symbols used to create another winning pattern, may then be removed from the game screen.

Thus, the stacking concept may have a stack of symbols that are either (a) all the same symbol as shown or (b) offer a variety of symbols stacked on the position. The player's eye movements may be used to peak at hidden symbols.

The stack doesn't have to have same symbol only characteristics or even consecutive symbol characteristics. The stacked symbols may be a random set of symbols. Removing or eliminating symbols from the stack based on winning patterns that involve the stack may lead to other winning patterns. In the embodiment illustrated, the game screen replenishes to allow for the chance at consecutive wins happening, depending on new symbols that replenish the screen.

FIG. 11 illustrates an exemplary embodiment for using the stacked symbols for the purposes of a secondary game. In this example, the player may interact with the additional symbols through tracked player movement and displace them onto one or more secondary game screens. For example, collecting symbols such as Aces, Kings and Jacks may provide additional credits when a given number of these symbols are collected. Alternatively, the symbols may be displaced onto the secondary game screens automatically, without player interaction. Other manners of integrating the additional symbols into a secondary game may be used. The secondary game may be used to trigger a bonus game, for example. The secondary game may also include three dimensional enhancements.

While illustrated in the block diagrams as groups of discrete components communicating with each other via distinct electrical data signal connections, the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching example embodiments. The hardware components are configured to provide practical applications of innovative computerized gaming features. The hardware components are configured to provide physical transformations by, for example, transforming the display on gaming screen with three dimensional enhancements.

The concept of enhanced game components may be applied to game mechanics in multiple ways. For example, Wild cards may be placed one on top of each other to create a depth showing multiple wilds in one spot resulting in awarding of the same line multiple times. Wilds may have a multiplier attached to each of the layers in the depth, for example, the front one is worth 1×, the second level is worth 2×, the third level is worth 3×, etc. Surrounding Wilds may be used by offering a layer above a regular reel set that would allow for wilds to be created when reels stop (i.e. any symbol landing would have the opportunity to become wild). This allows for depth to the surrounding wilds. For games that may have a match functionality, it would allow for chunks of wilds and symbols to pay. In some embodiments, Wilds may stay in place until it is awarded. This would allow for the wild to grow in size allowing for either: multiplier attached to the wild; additional wilds stacking up and growing on the spot; or physically growing outwards on the Z axis onscreen. The player movement may activate or reveal wilds that may be hidden from a current view.

Scatters may be used in a stacked configuration as well. Scatters may be placed on top of each other to create a depth showing multiple scatters in one spot, resulting in an award for a collective number of scatters. Scatters may also have a multiplier attached to each of the layers in the depth, for example, the front one is worth 1×, the second level is worth 2×, the third level is worth 3×, etc.

The third dimension provided by the enhanced game components, and the interactivity through tracked player movement may act as a portal or hole into the game (e.g. base game, secondary game, bonus game), given access to a bonus round or an additional win category. The additional games may contain components that may also be moved using player movement. Symbols may appear with multiple layers and players may collect symbols and place them one on top of another in a single space. Three-dimensional stacks may be formed by allowing for symbols to be stacked not just on the vertical but also in the third (z) axis, allowing for depth to the normally viewed stacked symbol.

The game component enhancements allow for chunks of symbols that are spanning the vertical space of the reel to also have a back expansion area that causes a 'block' effect. It allows for chunks of symbols that are spanning the horizontal space of the reel to also have a back expansion area that causes a 'block' effect. It may also allow for depth on certain reels to create a new pattern of the physical game grid dimension. The chunks of symbols may be manipulated and moved using player movement including eye movements.

Triggers may be modified using the game component enhancements involving tracked player movement. Triggers may be activated using tracked player movement. Such triggers may include, for example, consecutive triggers (on or outside of a reel), scatter, and trigger tiles. Triggers may lead to various events, such as additional credits, additional payouts, secondary games, bonus rounds, etc. Trigger tiles may be placed on any reel shape/dimension as desired, as a triggering mechanism. Multiple layers could be applied to this triggering mechanism as well. Pay ways may also be modified, as the enhancements allow for multiple games to be played in the same space. Shapes of lines wins may be collected to create a full screen pattern of extra prizes. Different layers with different line sets may be played all at once.

The game enhancements through tracked player movement may be applied to multiple environments, such as Keno, 3D game grids, Player User Interfaces (PUI), Greenball (as described in U.S. application Ser. No. 13/631,129, the contents of which are hereby incorporated by reference), and many others. For Keno, multiple balls may be placed on a same number. One screen may be provided with layered effects. For 3D game grids, a 'cube' effect may be created, where the player can interact with the cube to 'spin' it to reveal an additional bonus prize. The enhancement offers a position to expand outwards to create a multiple symbol container. It also offers multi-levels, different matrices, games that become available during bonus rounds as special features activate the exterior, or multiple games to be wagered upon. Multi-facet game boards (i.e. with a matrix on different angles) are also possible.

Bonus types may also be enhanced via the game component enhancements through tracked player movement. For example, multiple free games may be played in a layered style. This allows for symbols that land one in front of another that match to create some sort of super win/super symbol that spans in depth and possibly in height, if synchronized reels are used. In a picking screen for picking a prize, the player may grab and drag the 3D object and reposition it on the screen. Progressive posts may get physically larger and expand outwards to show the player that they are getting closer to being awarded, and/or larger in value.

The user interfaces, computer implemented methods, and computer system components described may be used in connection with a variety of different games that are pattern games or that include pattern game components. Other example games include maze-type games or navigational games.

Various functions or features described in this disclosure may be implemented as part of different gaming systems. For example:

(A) The winning enhancements may be implemented as part of a game to system (G2S) system.

(B) As previously stated, the user interfaces, computer implemented methods, and computer system components described herein may be used by an EGM.

(C) In the event the game is a lottery game, the game computer may be an in-store gaming system or a gaming kiosk. For lottery games including the enhancements to the game components, the host system may be controlled by a government agency.

As described herein, a third dimension may be provided by the enhanced game components. Interactivity may be provided through tracked player movement. Three dimensional enhancements may be provided as a primary game (or base game), secondary game or a bonus game in some embodiments. Motion tracking data for the player received via camera may be used to update and modify the three dimensional enhancements, for example. Head and body movements of the player may control aspects of the game.

In some example embodiments, the number of bonus choices may be proportional to the size of the bet, or average bet. The number of features may also be proportional to the size of the bet, or average bet.

Three dimensional enhancements through tracked player movement may be provided as dynamic content, where bonus selection and other gaming features may display differently from one trigger or movement to the next. The three dimensional enhancements provide variety in primary and bonus game types to appeal to a broad player demographic.

A bonus game may include progressive levels and may be of a different game type than the primary game, including new symbols and rules. There may also be hidden features within the game.

The game may be a tile based game where different lines shapes of corresponding tiles may be associated with different winning amounts for the game.

Three dimensional enhancements may be used for various game features. For example, there may be a three dimensional enhancement for a trigger symbol, a base game, a tension spin, a large or medium win, a bonus game, a bonus game choice entry, help functionality, introduction to game, and so on.

An example flow for a game with three dimensional enhancements may include a base game with bonus or hidden features. There may be a trigger within the base game to launch a bonus selection game level where the player can select a bonus game from multiple choices. There may be a short description for each bonus game. The amount of bet or average bet within the base game may be proportional to the number of bonus game choices. For example, a higher bet may increase the number of bonus games to select from. The bonus games may be different types of games. The base game may also be a different type of game.

The game may be played on a standalone video gaming machine, a gaming console, on a general purpose computer connected to the Internet, on a smart phone, or using any other type of gaming device. The video gaming system may include multiplayer gaming features.

The game may be played on a social media platform, such as Facebook™. The video gaming computer system may also connect to a one or more social media platforms, for example to include social features. For example, the video gaming computer system may enable the posting of results as part of social feeds. In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game to the player.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

The invention claimed is:

1. A computer device for moving game components, the computer device comprising:

at least one data storage device to store game data for a game;

a display device to display via a user interface at least one three-dimensional game component of the game in accordance with a set of game rules using the game data, each of the at least one three-dimensional game components comprising at least one game component movement attribute;

at least one data capture device to collect player movement data corresponding to a player, wherein the player movement data comprises at least one movement attribute, and that the data capture device includes a camera, a sensor or other data capture electronic hardware; and at least one processor configured to:

transform the player movement data into data defining game movement for the at least one three-dimensional game component by comparing the at least one game component movement attribute to the at least one movement attribute; and generate movement on the display device of the at least one three-dimensional game component using the data defining game movement, wherein the at least one data capture device is configured to collect player movement data associated with movement of the player's eyes, wherein the game is a maze type game, wherein the at least one three-dimensional game component comprises a virtual avatar that is navigated through the maze using the player movement data that is associated with the movement of the player's eyes and that represents a position of the player on the display device relative to other game components displayed on the display device, wherein the virtual avatar comprises a horizontal game movement attribute, and wherein the at least one movement attribute comprises horizontal movement of the player's eyes.

2. The computer device of claim 1, wherein the at least one three-dimensional game component includes a first three-dimensional game component and a second three-dimensional game component, the first three-dimensional game component comprising a first game component movement attribute, the second three-dimensional game component comprising a second game component movement attribute, wherein the player movement data comprises a first movement attribute and a second movement attribute; and wherein the at least one processor is configured to transform the player movement data into data defining game movement for the first and second three-dimensional game components by comparing the first and second game component movement attributes to the first and second movement attributes, and generate a movement on the display device of the first three-dimensional game component using the first movement attribute and generate a movement on the display device of the second three-dimensional game component using the second movement attribute.

3. The computer device of claim 1, wherein the at least one display device is configured to update a display of a view of the game using the data defining game movement.

4. The computer device of claim 1, wherein the at least one three-dimensional game component comprises: a virtual character, a gaming symbol, a stack of game components along an axis orthogonal to a plane of the display device, a multi-faceted game component, a reel, a grid, and a multi-faceted gaming surface.

5. The computer device of claim 1, wherein, responsive to horizontal movement of the player's eyes, the virtual avatar moves left or right relative to displayed game components.

6. The computer device of claim 5, wherein the virtual avatar moves left or right to avoid displayed game components.

7. The computer device of claim 5, wherein the virtual avatar moves left or right to contact displayed game components.

8. A computer-implemented method for moving game components in a gaming system, the method comprising:

displaying on a display device via a user interface at least one three-dimensional game component of a game in accordance with a set of game rules for the game, each of the at least one three-dimensional game components comprising at least one game component movement attribute;

collecting player movement data using a camera or a sensor, wherein the player movement data comprises at least one movement attribute;

transforming, using a processor, the player movement data into data defining game movement for the at least one three-dimensional game component by comparing the at least one game component movement attribute to the at least one movement attribute; and generating movement on the display device of the at least one three-dimensional game component using the data defining game movement, wherein the game is a maze type game, wherein the collected player movement data comprises data associated with movement of the player's eyes, wherein the at least one three-dimensional game component comprises a virtual avatar that is navigated through the maze using the player movement data that is associated with the movement of the player's eyes and that represents a position of the player on the display device relative to other game components displayed on the display device, wherein the virtual avatar comprises a horizontal game movement attribute, and wherein the at least one movement attribute comprises horizontal movement of the player's eyes.

9. The computer-implemented method of claim 8, wherein:

the at least one three-dimensional game component includes a first three-dimensional game component and a second three-dimensional game component, one of the first three-dimensional game component and the second three-dimensional game component is selected using the player movement data, the first three-dimensional game component comprises a first game component movement attribute, the second three-dimensional game component comprises a second game component movement attribute, wherein the player movement data comprises a first movement attribute and a second movement attribute;

transforming the additional player movement data into data defining game movement for the first and second three-dimensional game components by comparing the first and second game component movement attributes to the first and second movement attributes; and generating a movement on the display device of the first three-dimensional game component using the first movement attribute and generating a movement on the display device of the second three-dimensional game component using the second movement attribute.

10. The computer-implemented method of claim 9, wherein, responsive to movement of the player's eyes, hidden aspects of a selected one of the first three-dimensional game component and the second three-dimensional game component are displayed to the player.

11. The computer-implemented method of claim 8, further comprising:

updating a view of the game using the data defining game movement.

12. The computer-implemented method of claim 8, wherein the at least one three- dimensional game component comprises: a virtual character, a gaming symbol, a stack of game components along an axis orthogonal to a plane of the display device, a multi-faceted game component, a reel, a grid, and a multi-faceted gaming surface.

13. The computer-implemented method of claim 8, wherein, responsive to horizontal movement of the player's eyes, hidden aspects of a game surface are displayed to the player.

* * * * *